United States Patent [19]
Kornatowski

[11] 4,434,880
[45] Mar. 6, 1984

[54] HANDWHEEL CLUTCH FOR SEWING MACHINES
[75] Inventor: Boleslaw Kornatowski, Elizabeth, N.J.
[73] Assignee: The Singer Company, Stamford, Conn.
[21] Appl. No.: 329,637
[22] Filed: Dec. 11, 1981
[51] Int. Cl.³ .................. F16D 11/00; D05B 59/00
[52] U.S. Cl. .................. 192/67 R; 192/114 R; 112/279; 112/220
[58] Field of Search .......... 192/67 R, 95, 24, 25, 192/114 R; 112/279, 220; 242/20, 23, 24

[56] References Cited
U.S. PATENT DOCUMENTS
3,206,212 9/1965 Wallace et al. .................. 192/25
3,353,640 11/1967 Leslie .
3,869,030 3/1975 Masaki .

FOREIGN PATENT DOCUMENTS
39-751214 10/1964 Japan .
49-100753 8/1974 Japan .
49-120463 10/1974 Japan .
53-52952 7/1978 Japan .
53-46827 11/1978 Japan .

Primary Examiner—Rodney H. Bonck
Assistant Examiner—James J. Merek
Attorney, Agent, or Firm—William V. Ebs; E. L. Bell; Robert E. Smith

[57] ABSTRACT

A handwheel clutch for a sewing machine having a bistable tiltable element for engaging or disengaging the clutch thereby coupling or decoupling the handwheel from the arm shaft.

4 Claims, 4 Drawing Figures

HANDWHEEL CLUTCH FOR SEWING MACHINES

DESCRIPTION

BACKGROUND OF THE INVENTION

This invention relates to combination handwheels and handwheel clutches for sewing machines and, more particularly, to a handwheel clutch that may be decoupled from the arm shaft of a sewing machine by light manual pressure on a tiltable member associated with a handwheel. In a typical sewing machine, a handwheel is provided which is coupled to both an electric drive motor and to the arm shaft by a clutching device. In many instances, a bobbin winder is provided which is driven by frictional contact with the handwheel. Since the arm shaft drives all of the other mechanisms in the sewing machine it is desirable to declutch the handwheel from the arm shaft when winding thread on a bobbin. Prior art handwheel clutches tend to detract from the aesthetic appearance of the sewing machine and are frequently composed of many highly precision parts resulting in a complex and costly mechanism.

It is therefore an object of this invention to provide a handwheel declutching mechanism wholly contained within the interior of the handwheel to preserve the aesthetic appearance of the sewing machine.

It is another object of this invention to provide a handwheel declutching mechanism of simple construction, few parts, that is relatively inexpensive to manufacture and maintain.

Other objects and advantages of the invention will become apparent through reference to the accompanying drawings and descriptive matter which illustrate a preferred embodiment of this invention.

SUMMARY OF THE INVENTION

According to the present invention, there is provided a sewing machine having an arm shaft, a handwheel, and a drive means for rotating the handwheel. A clutch means is provided for drivingly coupling the handwheel to the arm shaft. The clutch means comprises a drive notch formed in the handwheel and a driving element supported on a segment of the arm shaft for rotation therewith. The driving element is arranged to tilt between each of two bistable positions. When in the first bistable position, the driving element is in driving engagement with the drive notch and when in the second bistable position, the driving element is out of driving engagement with the drive notch.

The driving element comprises a substantially planar yoke having a pair of flexible members each joined at one extremity to the yoke and arranged with their free extremities facing each other and spaced apart a predetermined distance. Means is provided for interlocking the yoke on the arm shaft or rotation therewith. Diametrically opposed reception seat surfaces are formed on the arm shaft and are spaced apart a distance which is greater than the predetermined distance between the free extremities of the flexible members. The yoke is assembed on the arm shaft with the free extremities of the flexible members arranged in engagement with a respective one of the diametrically opposed reception seat surfaces. The flexible members are each flexed to a position on an opposite side of the plane of the yoke. Means is provided for interlocking the yoke with the arm shaft for rotation therewith when the free extremities of the flexible members are in engagement with the reception seat surfaces.

BRIEF DESCRIPTION OF THE DRAWINGS

In order that the invention be more fully understood, it will not be described, by way of example, with reference to the following drawings in which.

DESCRIPTION OF THE PREFERRED EMBODIMENT

Figure 1:
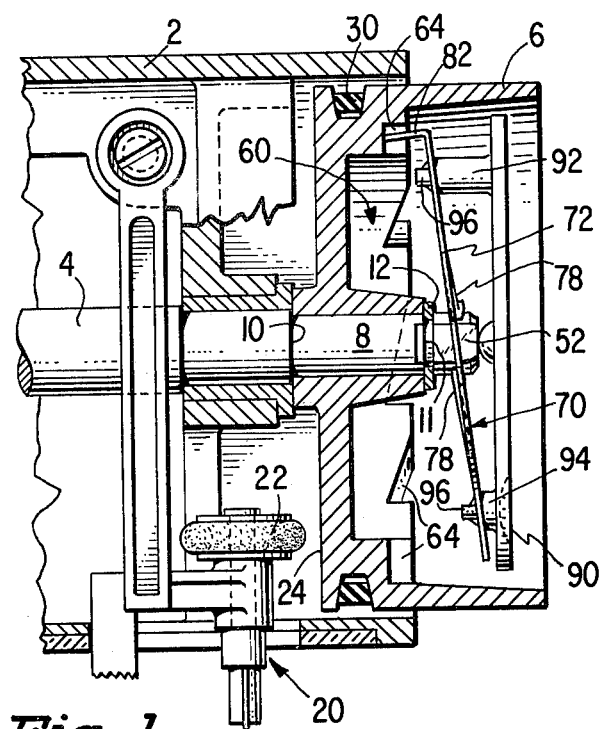
FIG. 1 is a cross sectional view of the handwheel and handwheel clutch assembly of the sewing machine illustrating a preferred embodiment of the invention.

Referring to FIGS. 1 through 4, there is shown a sewing machine 2 having an arm shaft 4 with a handwheel 6 rotationally supported thereon. The handwheel 6 is free to rotate on the diameter 8 of the arm shaft 4 and is retained between the shoulder 10 and the snap ring 12. A bobbin winder mechanism shown generally at 20 is of conventional construction having a friction wheel 22 which may be placed in frictional engagement with the surface 24 of the handwheel 6 for rotational driving thereby. During the normal sewing operation, the friction wheel 22 is out of engagement with the surface 24 as shown in FIG. 1. A drive belt 30 rotationally couples the handwheel 6 to a drive motor, not shown.

Figure 4:
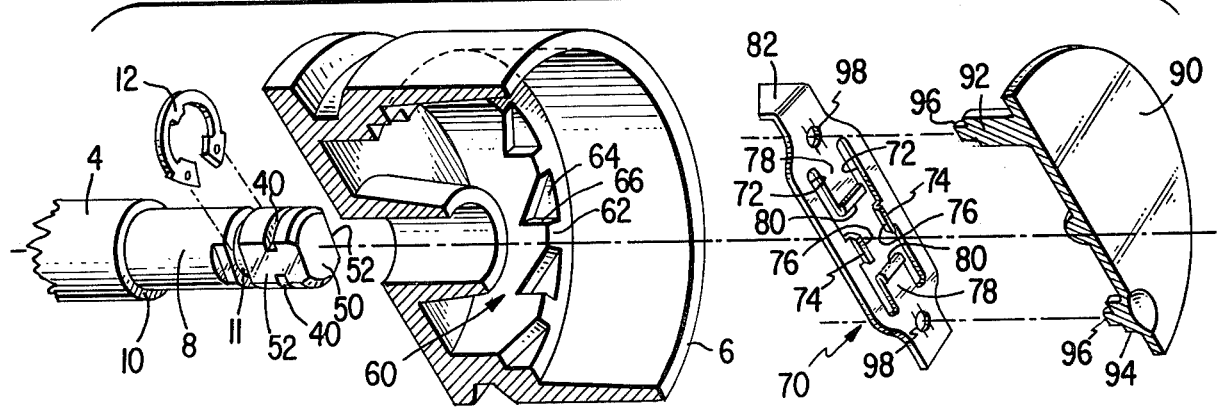
FIG. 4 is an exploded perspective view showing the handwheel and clutch components of the present invention.

Referring to FIG. 4, there is shown an exploded perspective view of the component parts comprising the handwheel clutch assembly. A pair of parallel grooves, or reception seat surfaces, 40 are formed in a segment of the arm shaft 4 normal to the axis and adjacent the snap ring groove 11. Two diametrically opposite and substantially parallel flats 52 are formed on the end 50 of the arm shaft 4 normal to the pair of grooves 40. The handwheel 6 has a hollow interior 60 and a shoulder 62 formed on the inner wall thereof. A series of drive notches 64 are equally spaced about the shoulder 62 each having a drive surface 66 that is substantially parallel to the axis of the arm shaft 4. A driving element, generally shown at 70, comprises a yoke 72 having a drive tap 82 formed normal thereto, two inwardly projecting stop members 72 having opposing face surfaces 76, and two inwardly projecting flexible members 78 having free extremities 80 facing each other. The two opposing face surfaces 76 are spaced apart so that they will slidingly engage the pair of flats 52 of the arm shaft 4. With the surfaces 76 in engagement with the pair of flats 52, the drive element 70 is rotationally coupled to, or interlocked with the arm shaft 4 and must rotate therewith.

The two opposing free extremities 80 of the flexible members 78 are spaced apart a predetermined distance that is slightly smaller than the distance between the pair of grooves 40. The extremities 80 may be formed with a small turned edge or lip, as shown in FIG. 4. This lip, however, should seat well into the groove 40 yet permit sufficient movement so that the drive element 70 may be tilted between the bistable position shown in FIG. 1 and that shown in FIG. 2. The driving element 70 is disposed on the arm shaft so that the two opposing free extremities 80 interferingly engage the pair of grooves 40 and the two stop members 74 slidingly engage the pair of flats 52, as shown in FIG. 3. Each flexible member 78 is flexed to a position on an opposite side of the plane of the yoke 72. That is, the yoke 72 is assembled on the arm shaft 4 with one flexible member 78 flexed in a direction away from the end 50 of the arm shaft 4 and the other flexible member 78 flexed in a direction toward the end 50. This positioning of the two flexible members 78 in opposite directions causes the distance between the two facing extremities 80 to become greater so that the extremities 80 will embrace the pair of grooves 40. This will cause the yoke 72 to tilt with respect to a plane containing the two grooves 40 into a first bistable position. By applying manual pressure to the drive element 70, thereby causing it to tilt in the opposite direction, the two flexible members 78 will reverse their positions: the one that was flexed toward the end 50 will now be flexed away from the end 50 and the other that was flexed away from the end 50 will now be flexed toward the end 50 thereby causing the yoke 72 to tilt into a second bistable position. The two extremities 80 are always in engagement with the grooves 40, thereby retaining the driving element 70 on the arm shaft 4. Additionally, since the two opposing face surfaces 76 of the stop members 74 are always maintained in sliding engagement with the pair of flats 52, the driving element 70 is interlocked with the arm shaft so that one must rotate with the other in each of the bistable positions. If the torque requirements of the sewing machine are not prohibitively large, the stop members 74 may be eliminated. In this case the free extremities 80 seating in the grooves 40 perform the interlock function thereby preventing relative rotation between the yoke 72 and the arm shaft 4.

Referring now to FIG. 4, an actuating plate 90 made of a suitable plastic material, has molded therein a long boss 92 and a short boss 94. Each boss has a molded extension 96 which lockingly engages a pair of mounting holes 98 formed in the driving element 70. This actuating plate 90 is included in the interest of operator safety and is not necessary for the successful practice of this invention. As can be seen in FIG. 1, the length of the bosses 92 and 94 are such that the actuating plate 90 is substantially square with respect to the handwheel 6 when the end 82 of the driving element 70 has engaged the drive notch 64. This is its normal position when sewing.

Figure 2:
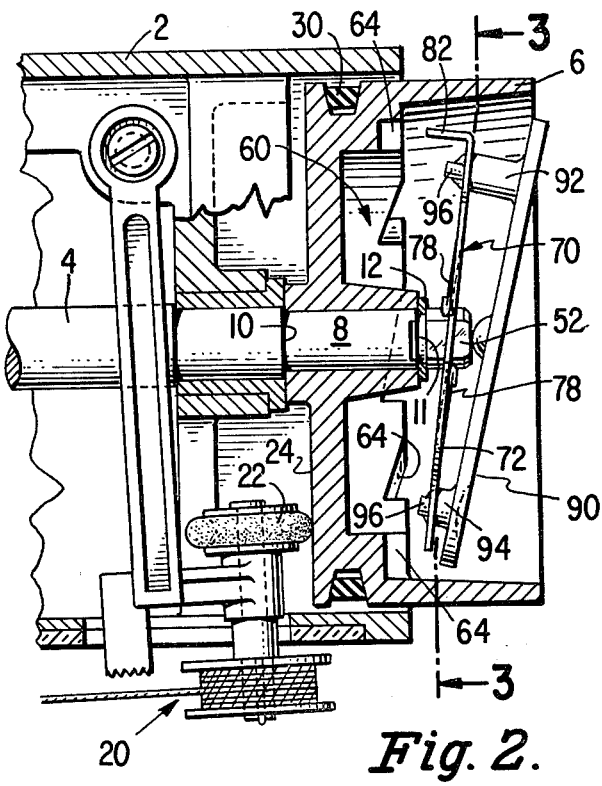
FIG. 2 is a cross sectional view similar to that of FIG. 1.
Figure 3:
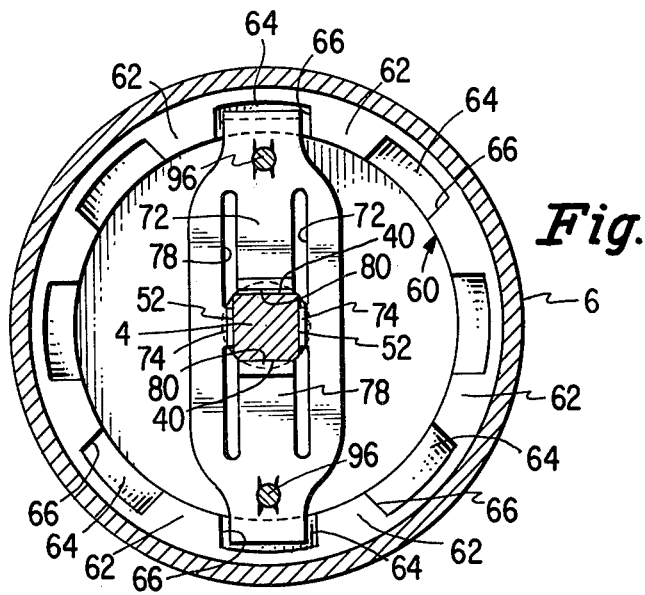
FIG. 3 is a cross sectional view taken along the line 3—3 of FIG 2.

In operation, the operator will depress the actuating plate 90, tilting it into its second bistable position, as shown in FIG. 2, wherein the end 82 is out of engagement with the drive notch 64 thereby rotationally decoupling the handwheel 6 from the arm shaft 4. With the driving element 70 in this position the friction wheel 22 of the bobbin winder 20 may be engaged with the surface 24 of the handwheel 6 for winding the bobbin without effecting rotation of the arm shaft. When the winding operation is completed the bobbin winder 20 is disengaged from the surface 24 and the actuating plate 90 is returned to its first bistable position.

As can be seen, the driving element 70 is of unitary construction thereby providing a unique and extremely simple clutch structure. With this arrangement the component parts are economical to manufacture and extremely simple to assemble. The important and unique features of this invention are manifested in the bistable driving element having flexible members which engage the arm shaft for biasing the driving element in either of the two bistable positions.

Upon reviewing the present disclosure a number of alternative constructions will occur to one skilled in the art. Such constructions may utilize variations in the driving element 70 such as a single flexible member 78 or variations in other components of the present invention. These constructions however are considered to be within the spirit and scope of this invention.

I claim:

1. In a sewing machine having an arm shaft, a handwheel, and a drive means for rotating said handwheel, a clutch means for drivingly coupling said handwheel to said arm shaft comprising a drive notch formed in said handwheel and a driving element supported on said arm shaft for rotation therewith and arranged to tilt between each of two bistable positions, a first of said bistable positions in which said driving element is in driving engagement with said drive notch and a second of said bistable positions in which said driving element is out of driving engagement with said drive notch, wherein said driving element comprises:
   a. a substantially planar yoke having a pair of flexible members each joined at one extremity to said yoke and arranged with their free extremities facing each other and spaced apart a predetermined distance;
   b. diametrically opposed reception seat surfaces formed on said arm shaft spaced apart a distance which is greater than said predetermined distance between said free extremities of said flexible members;
   c. said yoke being assembled on said arm shaft with said free extremities of said flexible members arranged each in engagement with a respective one of the diametrically opposed reception seat surfaces on said arm shaft and with said flexible members being flexed each to a position on an opposite side of the plane of said yoke; and
   d. means for interlocking said yoke with said arm shaft for rotation therewith when said free extremities of said flexible members are in engagement with said reception seat surfaces.

2. The combination of claim 1 wherein said diametrically opposed reception seat surfaces comprise parallel grooves formed normal to the axis of said arm shaft and wherein said free extremities of said flexible members are formed to pivotally seat in said grooves.

3. The combination of claims 1 or 2 wherein said free extremities of said flexible members are formed with a turned over lip having a thickness slightly less than the width of one of said grooves.

4. The combination of claim 3 wherein said means for interlocking said yoke with said arm shaft comprises a flat surface formed on said arm shaft parallel to the axis thereof and said yoke further comprises a side wall arranged to loosely contact said flat surface thereby effecting a rotational couple between said arm shaft and said yoke.

* * * * *